United States Patent
Park

(10) Patent No.: US 7,969,630 B2
(45) Date of Patent: Jun. 28, 2011

(54) IMAGE FORMING APPARATUS FOR SECURITY TRANSMISSION OF DATA AND METHOD THEREOF

(75) Inventor: Sun Young Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 11/972,108

(22) Filed: Jan. 10, 2008

(65) Prior Publication Data

US 2008/0180735 A1    Jul. 31, 2008

(30) Foreign Application Priority Data

Jan. 26, 2007    (KR) .................. 10-2007-0008467

(51) Int. Cl.
*H04N 1/46* (2006.01)
*G06K 15/02* (2006.01)
*G06K 9/34* (2006.01)
*G06F 3/12* (2006.01)

(52) U.S. Cl. ........ 358/530; 358/1.2; 358/1.15; 382/173; 382/176; 382/181; 382/276; 382/282; 382/306

(58) Field of Classification Search .................. 358/530, 358/2.99, 448, 1.15, 1.18, 450, 1.11, 1.9, 358/1.17, 1.2; 382/181, 173, 176, 276, 282, 382/299, 306, 232, 239; 370/474, 428; 707/3; 715/526; 705/51
See application file for complete search history.

(56) References Cited

U.S. PATENT DOCUMENTS

| | | | | |
|---|---|---|---|---|
| 6,799,302 | B1* | 9/2004 | Sites | 715/210 |
| 7,092,568 | B2* | 8/2006 | Eaton | 382/181 |
| 2002/0150124 | A1* | 10/2002 | Asano | 370/474 |
| 2006/0200453 | A1* | 9/2006 | Santrosyan et al. | 707/3 |
| 2006/0262986 | A1 | 11/2006 | Ohk | |
| 2007/0165280 | A1* | 7/2007 | Yago | 358/2.99 |

FOREIGN PATENT DOCUMENTS

| | | |
|---|---|---|
| CN | 1550973 | 12/2004 |
| CN | 1790377 | 6/2006 |
| JP | 2001-75885 | 3/2001 |

OTHER PUBLICATIONS

Chinese Office Action issued Jan. 8, 2010 in CN Application No. 2008102147128.

* cited by examiner

*Primary Examiner* — Charlotte M Baker
(74) *Attorney, Agent, or Firm* — Stanzione & Kim, LLP

(57) ABSTRACT

In an image forming apparatus and a data transmission method thereof, text data are extracted and transmitted for the purpose of the security management of data so that time and management cost of security violation are reduced. The image forming apparatus for security transmission of data includes a text extractor to extract text data from the data and a transmitter to transmit the text data to a management server to obtain transmission permission and then to transmit the data to a transmission target.

18 Claims, 5 Drawing Sheets

IMAGE FORMING APPARATUS FOR SECURITY TRANSMISSION OF DATA AND METHOD THEREOF

CROSS-REFERENCE TO RELATED APPLICATIONS

This application claims priority under 35 U.S.C. §119(a) from Korean Patent Application No. 2007-8467, filed on Jan. 26, 2007, in the Korean Intellectual Property Office, the disclosure of which is incorporated herein in its entirety by reference.

BACKGROUND OF THE INVENTION

1. Field of the Invention

The present general inventive concept relates to data transmission of an image forming apparatus, and more particularly, to an image forming apparatus for security transmission of data, wherein only text data are extracted and transmitted for the purpose of data security management, so that security management can be effectively performed with respect to data, and a transmission method of the image forming apparatus.

2. Description of the Related Art

In general, an image forming apparatus including function of a facsimile irradiates light onto a manuscript on which information is recorded, and converts the light reflected from the manuscript into an electric signal, so that an image recorded on the manuscript can be read. The image forming apparatus can transmit the data read through the aforementioned process to a receiving-side terminal or, on the contrary, reproduce the same image as information recorded on an original document based on data transmitted from the receiving-side terminal.

Before transmitting data to a receiving-side terminal using such an image forming apparatus, the data is previously transmitted to a security management object for the purpose of security management. The security management object receiving the transmitted data manages the transmitted data by identifying whether or not data in violation of security are contained in the transmitted data, so that only the identified data can be transmitted to the receiving-side terminal.

However, in a case where a large capacity of data, such as image data, are transmitted to the security management object, there is a problem in that it takes a long time to process the data for the purpose of security management in the security management object.

That is, in a case where the large capacity of data such as image data are transmitted to the security management object as an original image itself, the speed for transmitting the data becomes low. For this reason, there is a problem in that it takes a lot of time that to transmit the data to the security management object.

Further, since the security management object checks the security violation of transmitted data using an additional application program, there is a problem in that it takes a lot of time to process the data for the purpose of security management, and the security management is complicated.

Therefore, there occurs a problem in that many factors are required to check the security violation of a large capacity of data, such as image data, in view of the security management object.

SUMMARY OF THE INVENTION

The present general inventive concept provides an image forming apparatus for security transmission of data, having an improved structure in which only text data are extracted and transmitted for the purpose of secure transmission of data so that the time and management cost of security violations can be reduced and security management can be effectively performed with respect to data, and a transmission method of the image forming apparatus.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus for security transmission of data, the image forming apparatus including a text extractor to extract text data from data, and a transmitter to transmit the text data to a management server to obtain transmission permission and then to transmit the text data to a transmission target device.

The image forming apparatus may further include a determination unit that determines whether the data are image mixture data, wherein the text extractor extracts the text data from the data when the data are the image mixture data.

The image forming apparatus may further include an encoder to encode the text data extracted by the text extractor, and the transmitter may transmit the encoded text data to the management server.

If the data are the image mixture data, the text extractor may divide the data into background color data for a background color of the data, picture data, and text data, and may extract the text data from the divided data.

The image forming apparatus may further include a selection controller that controls an extraction selection window for extraction of text data such that the extraction selection window is displayed in a predetermined image display device when the data are the image mixture data.

The image forming apparatus may further include a user interface to receive selection input information input by a user for the purpose of extracting the text data.

The encoder encodes the extracted text data using an MR (Modified READ) or MMR (Modified MR) coding scheme.

The foregoing and/or other aspects and utilities of the present general inventive concept may also be achieved by providing a transmission method of an image forming apparatus for security transmission of data, the transmission method including extracting text data from data, and transmitting the text data to a management server to obtain transmission permission and then transmitting the text data to a transmission target device.

The transmission method may further include determining whether the data are image mixture data, and the text data may be extracted from the data when the data are the image mixture data.

The transmission method may further include encoding the text data after extracting the text data, and the encoded text data may be transmitted to the management server.

If the data are the image mixture data, the data may be divided into background color data for a background color of the data, picture data, and text data, and the text data may be extracted from the divided data.

The transmission method may further include controlling an extraction selection window for extraction of text data in such a manner that the extraction selection window is displayed in a predetermined image display device when the data are the image mixture data.

The transmission method may further include receiving selection input information input by a user for extracting the text data after the controlling the extraction selection window has been performed.

The foregoing and/or other aspects and utilities of the present general inventive concept may also be achieved by providing a computer-readable medium to contain computer-readable codes as a program to execute a transmission method of an image forming apparatus for security transmission of data, the transmission method including extracting text data from data, and transmitting the text data to a management server to obtain transmission permission and then transmitting the data to a transmission target device according to the transmission permission.

The foregoing and/or other aspects and utilities of the present general inventive concept may also be achieved by providing an image forming apparatus including a transmitter to transmit a portion of data to a management server without transmission permission, and to transmit an entire portion of the data to a transmission target device according to transmission permission.

The image forming apparatus may further include a controller to generate a window to control selection of the portion of the data when the data includes the portion and another portion.

The portion of the data may include text data, and the another portion of the data may include another data other than the text data.

The image forming apparatus may further include a scanning unit to scan a document to generate the data.

The image forming apparatus may further include a printing unit to print an image corresponding to the data according to the transmission permission.

The printing unit may not print the image corresponding to the data without the transmission permission.

The printing unit may print another image to correspond to another portion of the date without the transmission permission.

The foregoing and/or other aspects and utilities of the present general inventive concept may also be achieved by providing an image forming apparatus including a transmitter to transmit a portion of data to a management server to receive transmission permission on an entire portion of the data. 23.

The foregoing and/or other aspects and utilities of the present general inventive concept may also be achieved by providing an image forming apparatus including an extractor to receive data and to extract a portion of the received data, and a transmitter to transmit the extracted portion of the data according to transmission permission on the extracted portion of the data The foregoing and/or other aspects and utilities of the present general inventive concept may also be achieved by providing an image forming apparatus including a transmitter to transmit an entire portion of data according to transmission permission on a portion of the data.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
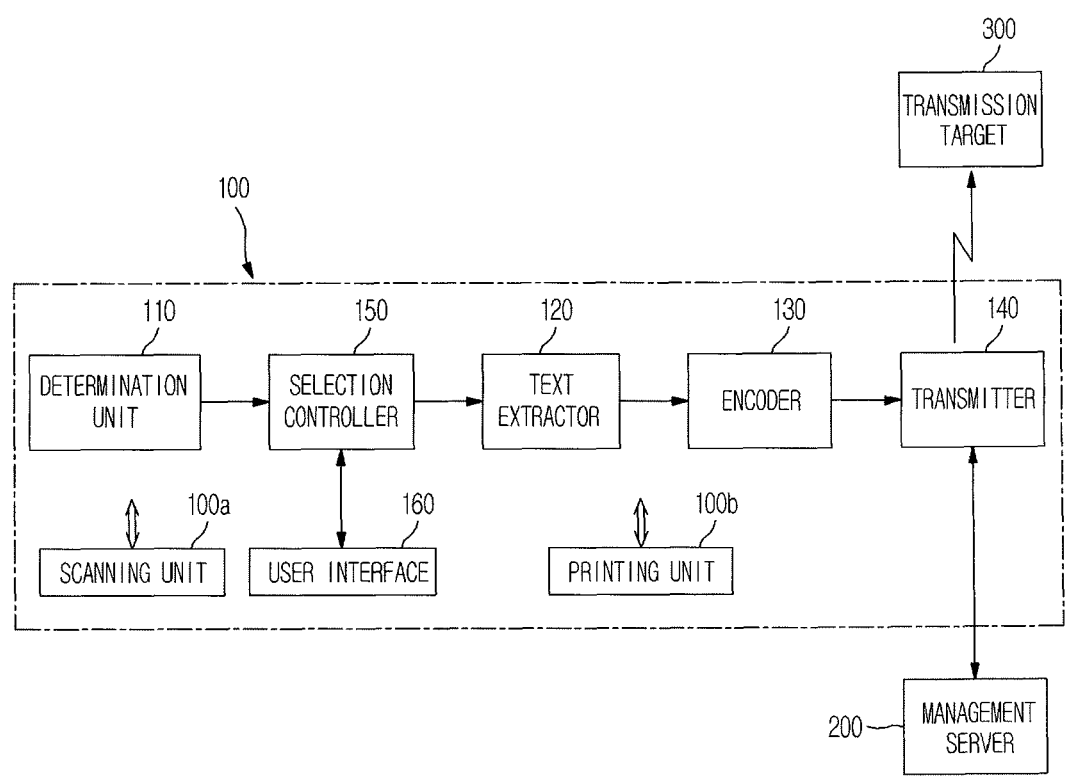
FIG. 1 is a block diagram illustrating an image forming apparatus for security transmission of data according to an embodiment of the present invention.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
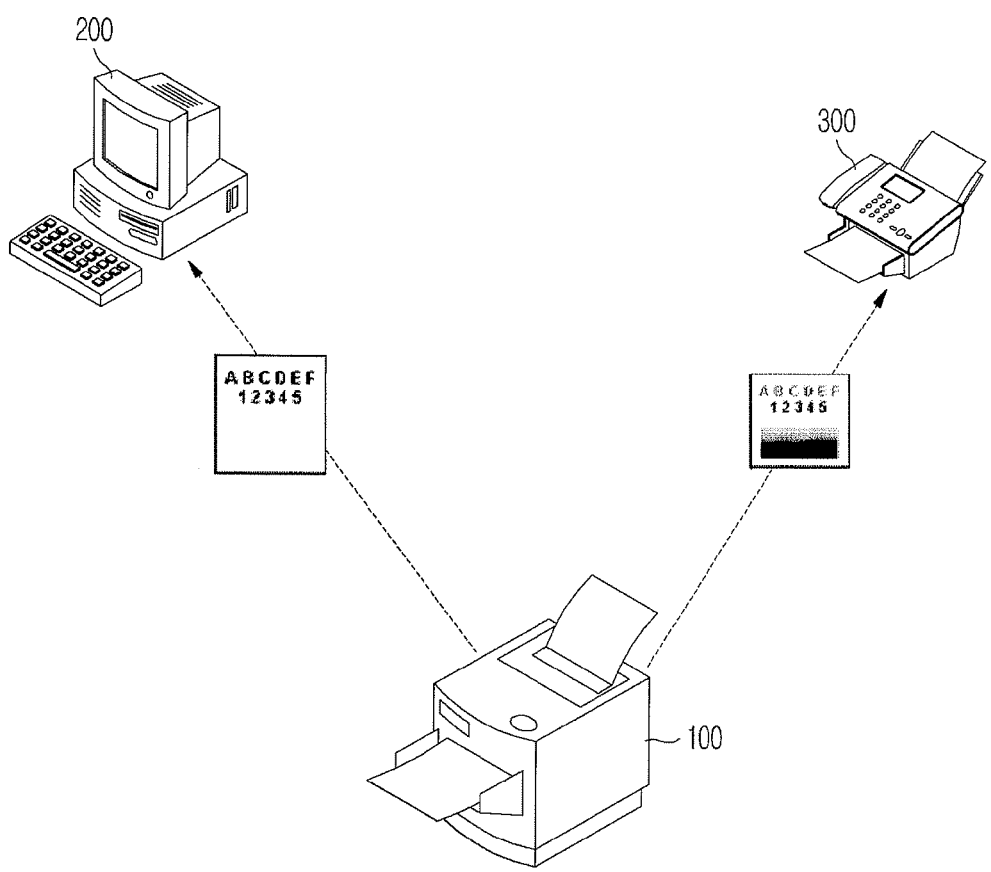
FIG. 2 is a schematic view illustrating a process of transmitting text data extracted for security management of data to a management server and transmitting data to a transmission target device according to an embodiment of the present general inventive concept.

FIG. 1 is a block diagram illustrating an image forming apparatus 100 to perform security transmission of data according to an embodiment of the present general inventive concept, and FIG. 2 is a schematic view illustrating a process of transmitting text data extracted from data to a management server to perform security management of the data and transmitting the data to a transmission target device according to an embodiment of the present general inventive concept. The image forming apparatus 100 includes at least one function of scan, fax, copy, and sending an e-mail. The image forming apparatus 100 for data security transmission includes a determination unit 110, a text extractor 120, an encoder 130 and a transmitter 140.

Referring to FIGS. 1 and 2, the image forming apparatus 100 communicates with a management server 200 and/or a transmission target device 300 through a wired or wireless communication line or a wired or wireless Internet network. The management server 200 may determine whether information provided from the image forming apparatus 100 violates security management and may issue security permission to the image forming apparatus 100 according to the provided information. The transmission target device 300 may another image forming apparatus, a facsimile machine, or a host computer, to process data received from the image forming apparatus.

The image forming apparatus 100 may further include a scanning unit 100a to scan a document to generate input data as the data. The scanning unit 100a scans the document and forms an image using information corresponding to the scanned document. A conventional image scanning apparatus can be used as the scanning unit 100a to generate the input data. It is also possible the image forming apparatus 100 may include a receiving unit connectable to an external device to receive input data as the data from the external device. Here, the scanning unit 100a can be replaced with the receiving unit to generate the input data.

The image forming apparatus 100 may further include a printing unit 100b having a printing medium feeding unit, an image forming unit to form an image on the fed printing medium feeding unit, and a discharging unit to discharge the printing medium. A conventional printing apparatus can be used as the printing unit 100b.

The printing unit 100b may print an image corresponding to the data according to transmission permission, and may print a portion of the image to correspond to a portion of data according to the transmission permission. If there is not transmission permission, the printing unit 100b may not print the portion of the image corresponding to the portion of the data. It is possible that the printing unit 100b may print another portion of the image to correspond to another portion of data other than the portion of the data when there is no transmission permission or until there is transmission permission.

Referring to FIGS. 1 and 2, the determination unit 110 receives and then determines whether or not the input data are image mixture data.

The image mixture data may be data including image data and text data. The image mixture data may contain information on an image, a color and a text, and an amount of data occupied per pixel in the image. For this reason, in order to effectively manage a large capacity of data, such as image data, the determination unit 110 determines whether or not the input data are the image data containing an image.

If the input data are the image mixture data, the text extractor 120 extracts the text data from the data.

In order to extract text data from the data as described above, the text extractor 120 divides the data into background color data for a background color of the data, picture data, and text data. Then, the text extractor 120 extracts the text data from the divided data.

Figure 3:
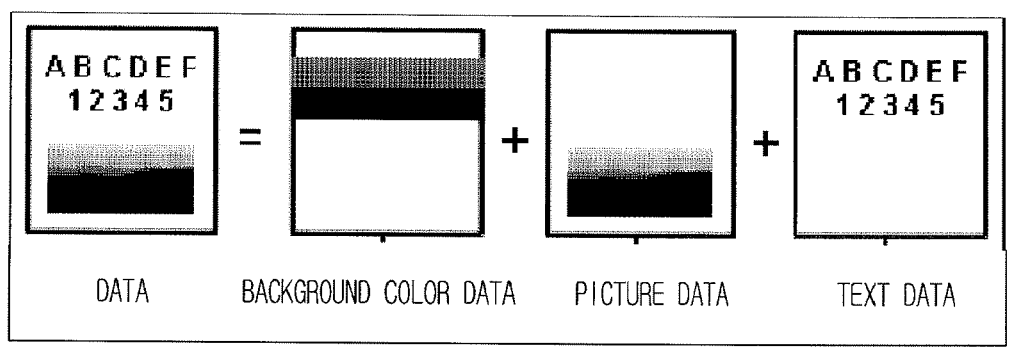
FIG. 3 is a view illustrating image mixture data divided into background color data, picture data and text data according to an embodiment of the present general inventive concept.

FIG. 3 is a view illustrating image mixture data divided into background color data, picture data and text data according to an embodiment of the present general inventive concept. As illustrated in FIGS. 1, 2, and 3, the text extractor 120 divides the image mixture data into the background color data, the picture data, and the text data.

Here, the background color data may be color data of a text constituting the text data.

For example, if the text data are formed with colors of red and blue, the background color data may be the color data of red and blue.

An MRC (Mixed Raster Content) method is used as a method for dividing the image mixture data into the background color data, the picture data, and the text data as described above.

Here, the MRC method may be a method of dividing data having an image and a text mixed therein into the image and the text. In the MRC method, the image is compressed through a compression method (JPEG) effective for the compression of an image, and the text is compressed through a compression method (MR or MMR) effective for a text, thereby dividing the data into the compressed image and text.

That is, in the MRC method, the image mixture data are divided into three different layers, i.e., a foreground layer, a background layer, and a mask layer, which correspond to the background color data, the picture data, and the text data, respectively. Each of the layers is individually compressed using a compression format most suitable for a format of each data. The compressed layers are restored and recombined to reconstitute an original image as the input image.

For example, the foreground layer of the background color data contains color data for a text and a line art, and may contain photographic or continuous tone color data. The background layer of the picture data generally contains color image data, in which a background image and a text can overlap with each other, or other patterns. The mask layer of the text data contains binary image data. The color image data may have a low resolution, and the binary image data may have a high space resolution.

The text data are extracted from the image mixture data using the method described above.

If the input data are image mixture data, the present embodiment may further include a selection controller 150 to generate an extraction selection window to control extraction of the text data such that the extraction selection window can be displayed in a predetermined image display device.

Figure 4:
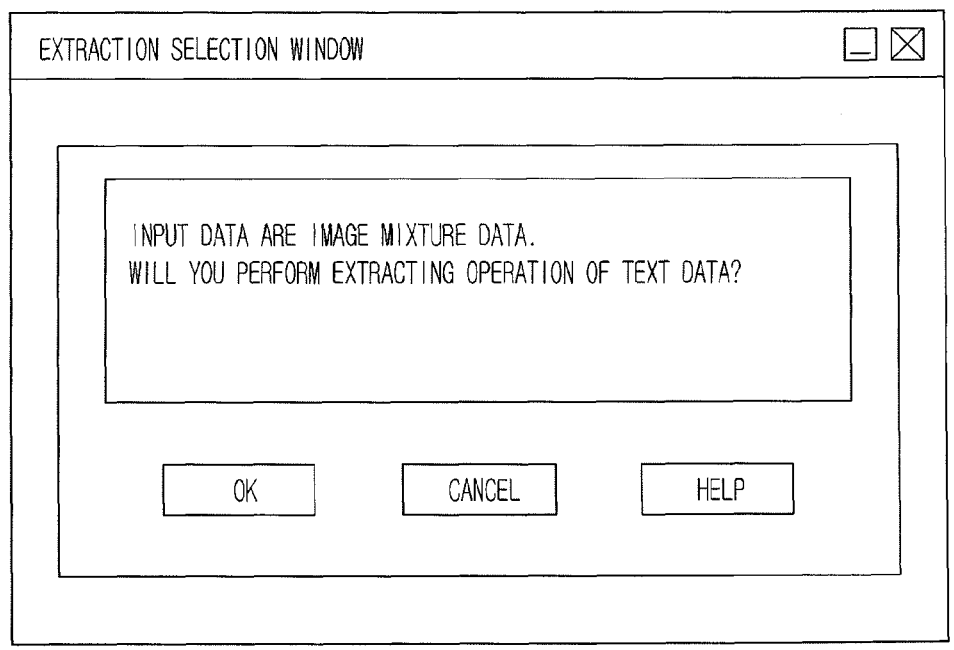
FIG. 4 is a view illustrating an extraction selection window for the extraction of text data according to an embodiment of the present general inventive concept.

FIG. 4 is a view illustrating an extraction selection window for the extraction of text data according to an embodiment of the present general inventive concept. As illustrated in FIGS. 1 and 4, the selection controller 150 outputs the extraction selection window to be displayed in a predetermined image display device for extraction of the text data, thereby receiving a selection input by a user through the extraction selection window.

For example, the selection controller 150 outputs the extraction selection window together with a message of "The input data are image mixture data. Will you perform the extracting operation of text data?", thereby receiving selection input information (selection) input through the extraction selection window.

Further, the present embodiment may further include a user interface 160 to receive the selection input information input by a user for the purpose of extracting the text data.

The user interface 160 may be configured to receive the selection input information, such as selection of at least one button of "Ok," "Cancel" or "Help" from a user for the purpose of extracting the text data as illustrated in FIG. 4.

If the "Ok" button is selected, an operation of extracting the text data is performed. If the "Cancel" button is selected, an operation of transmitting original data to the management server 200 without an extracting operation of the text data is performed.

If the "Help" button is selected, a help text to explain an operation performed when selecting the "Ok" button or "Cancel" button is provided.

The user interface 160 may include one or more devices directly handled by a user, such as a keyboard, touch screen, mouse, track ball or the like. Further, the user interface 160 may include an operation panel having a screen display window such as an LCD and operation buttons.

After having performed the operation of extracting the text data as described above, the encoder 130 encodes the extracted text data.

More specifically, the encoder 130 encodes the extracted text data using an MR (Modified READ) or MMR (Modified MR) coding scheme.

The MR coding scheme may be a second-dimensional coding scheme recommended by ITU-T for the purpose of high-efficiency transmission of a Group 3 facsimile device (G3). In the MR coding scheme, a pixel in which information is changed from white to black or vice versa on each scanning line is coded by using a relative distance from a reference pixel on a coding scanning line or on the immediately previous scanning line (reference line).

That is, the pixel having the changed information is highly efficiently coded by selecting any one of a vertical mode in which a distance from the reference pixel is coded, a horizontal mode in which a distance from the reference pixel on the coding scanning line, and a passing mode in which a pixel having the changed information is not indicated as the reference pixel.

The MMR coding scheme will be described based on the MR coding scheme. The MMR coding scheme has the same process as the MR coding scheme used in a Group 3 facsimile device (G3). However, the MMR coding scheme may be a coding scheme of maximizing the compression efficiency of the MR coding scheme.

After the text data is encoded using the MR or MMR coding scheme as described above, the transmitter 140 transmits the encoded text data to the management server 200 for security management of data.

That is, the transmitter 140 transmits the encoded text data to the management server 200, so that the management server 200 checks and manages the security violation of the data.

That is, the management server 200 receives a portion of the data, such as the text data, determines whether the portion of the data complies with an item of a security checking list or process, and generates security permission. When the image forming apparatus 100 receives the security permission from the management server 200, the image forming apparatus 100 transmits an entire portion of the data to the transmission target device 300.

It is possible that the text extractor 120 may extract at least a portion of the data other than the text data, if the portion of the data is subject to the security management. In this case, the image forming apparatus 100 extracts the portion from the data, encodes the extracted portion, and transmits the encoded portion to the management server 200. The management server 200 may determine when the portion is allowed to be transmitted to an external device. The image forming apparatus 100 transmits the entire portion of the data to the transmission target device 300 according to the transmission permission from the management server 200.

Then, the management server 200 receives the encoded text data transmitted from the transmitter 140 and decodes the encoded text data. After that, the management server 200 checks the security violation using the decoded text data.

That is, since the management server 200 does not receive the data transmitted as an original document itself like the aforementioned conventional configuration but receives only extracted text data out of the data, the capacity of data is decreased, so that the data can be effectively transmitted, and a processing time to be taken for checking security violations can be reduced.

Further, since only the text data are compressed to be transmitted, high efficiency can be expected in the detection of specific characters using an optical character reader (OCR) or the like.

That is, since the text data are detected by using the OCR, it will be more helpful in detecting specific characters hereafter.

If it is determined that no data in violation of security are contained in the transmitted data by checking the security violation of the transmitted data as described above, the management server 200 transmits a permission command signal for security identification of the text data to the transmitter 140. If the permission command signal for the security identification of the text data is input from the management server 200, the transmitter 140 transmits the input data to the transmission target device 300.

That is, if it is determined that no data in violation of security are contained in the transmitted data by checking the security violation of the transmitted data as described above, the transmitter transmits the input data to the transmission target 300.

The input data may be converted in a PDF or TIFF format to be transmitted to the transmission target device 300.

The PDF format is a file format developed by Adobe System as Acrobat Reader based on post script files. The PDF format has an advantage in that the editing and outputting of the document are possible regardless of the type of computers or operating systems. Since the insertion of texts, graphics, images and the like is free, and fonts or colors can be easily edited in the PDF format, the data may be converted into the PDF format to be transmitted to the transmission target device 300.

Further, the TIFF format means an image file format having a tag attached thereto as a raster image file format. The TIFF format refers to a standard file format used widely in scanning a still image with black-and-white or middle gray level to be stored or exchanged.

Accordingly, the aforementioned data can be converted into the PDF or TIFF format to be transmitted to the transmission target 300.

When data is input from the transmission target device 300, the aforementioned process of extracting text data from the input data is performed. After security violation has been verified from the management server 200, the data can be input from the transmission target device 300

More specifically, when data is input from the transmission target device 300, text data are extracted from the input data to be transmitted to the management server 200.

If it is determined that no data in violation of security are contained in the transmitted data by checking the security violation of the transmitted data, the management server 200 outputs a permission command signal. If the permission command signal is input, the image forming apparatus 100 can identify or store the data.

Hereinafter, a transmission method of an image forming apparatus for data security transmission will be described.

Figure 5:
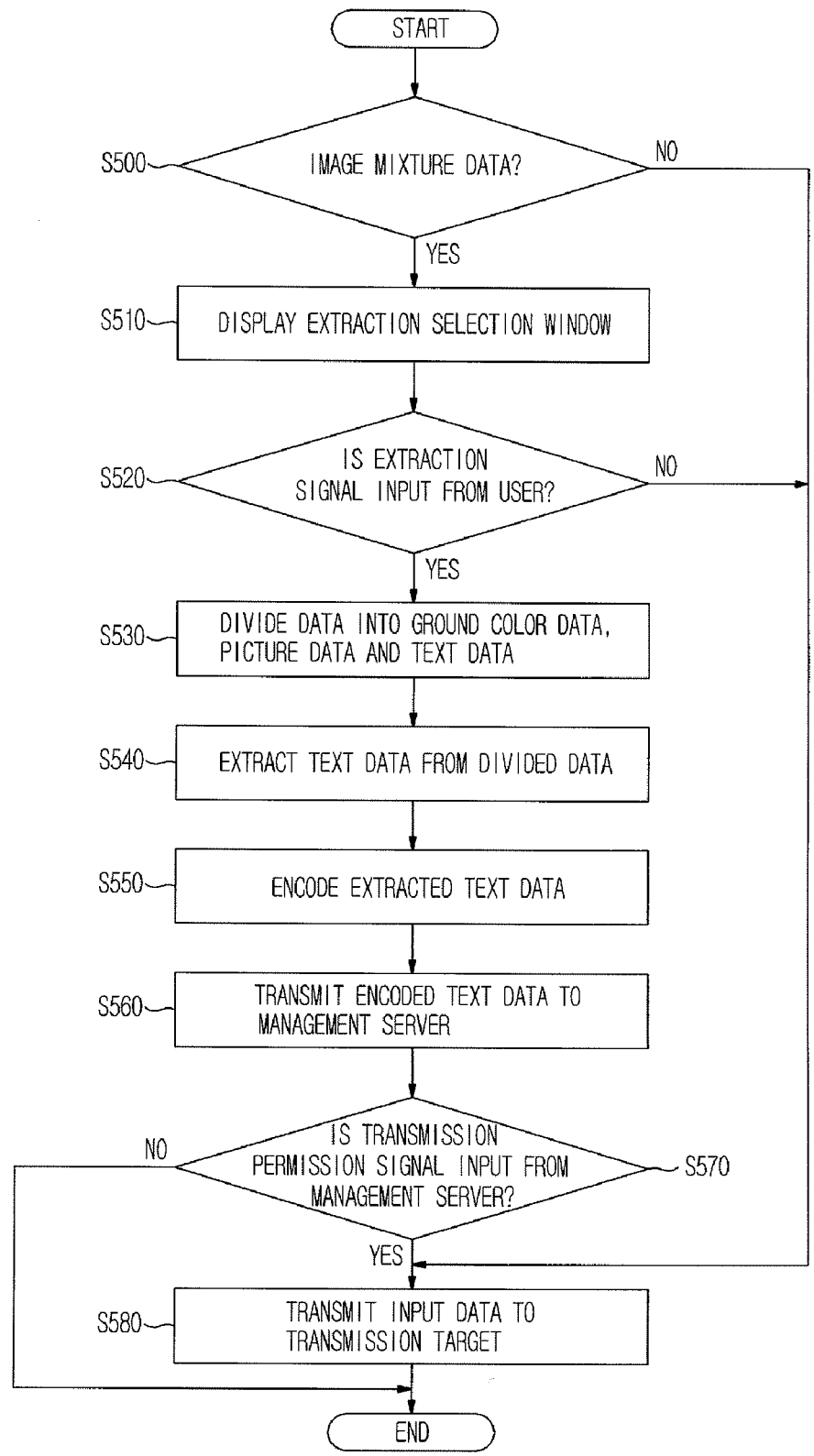
FIG. 5 is a flowchart illustrating a transmission process of an image forming apparatus for security transmission of data according to an embodiment of the present general inventive concept.

FIG. 5 is a flowchart illustrating a transmission process of an image forming apparatus for security transmission of data according to an embodiment of the present general inventive concept. As illustrated in FIG. 5, it is determined whether or not input data are image mixture data at operation S500.

In a case where the input data are image mixture data, it is determined whether or not text data is extracted.

Here, if the input data are image mixture data, an extraction selection window for extraction of text data is displayed in a predetermined image display device at operation S510, and it is determined whether an extraction signal for the text data is input from a user at operation S520.

When the selection input information is input by the user for the purpose of extracting the text data, the image mixture data are divided into background color data, picture data, and text data at operation S530, and the text data are extracted from the divided data at operation S540.

After having performed the extraction operation of the text data, the extracted text data are encoded at operation S550.

The encoded text data are transmitted to a management server at operation S560, and it is determined whether or not a permission command signal is input from the management server at operation S570. In a case where the permission command signal is input from the management server, the input data is transmitted to a transmission target at operation S580.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to an image forming apparatus for security transmission of data and a transmission method thereof, there is an advantage in that only text data are extracted and transmitted for the purpose of security management of data, so that the time and management cost of security violation can be reduced.

Further, since only text data required in a security check, security violation can be effectively checked.

Accordingly, there is an advantage in that a security manager can reduce factors are required to check the security violation of data. Moreover, only text data are compressed and transmitted, so that high efficiency can be expected in the detection of specific characters using an OCR or the like.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus for security transmission of data, the image forming apparatus comprising:
    a text extractor to extract text data from data including colors; and
    a transmitter to transmit the text data to a management server to obtain transmission permission by determining whether the text data is predetermined protected data that is not to be distributed, and then to transmit the data to a transmission target device according to the transmission permission where the text data is not the predetermined protected data.

2. The image forming apparatus of claim 1, further comprising:
    a determination unit to determine whether the data are image mixture data.

3. The image forming apparatus of claim 1, further comprising:
    an encoder to encode the text data extracted by the text extractor, wherein the transmitter transmits the encoded text data to the management server.

4. The image forming apparatus of claim 1, wherein, if the data are image mixture data, the text extractor divides the data into background color data for a background color of the data, picture data, and the text data, and then extracts the text data from the divided data.

5. The image forming apparatus of claim 2, further comprising:
    a selection controller to generate an extraction selection window to be displayed in a predetermined image display device to control the extraction of the text data when the data are the image mixture data.

6. The image forming apparatus of claim 5, further comprising:
    a user interface to receive selection input information input by a user to perform the extracting the text data.

7. The image forming apparatus of claim 3, wherein the encoder encodes the extracted text data using an MR (Modified READ) or MMR (Modified MR) coding scheme.

8. A transmission method of an image forming apparatus for security transmission of data, the transmission method comprising:
    extracting text data from data including colors; and
    transmitting the text data to a management server to obtain transmission permission by determining whether the text data is predetermined protected data that is not to be distributed, and then transmitting the data to a transmission target device according to the transmission permission where the text data is not the predetermined protected data.

9. The transmission method of claim 8, further comprising:
    determining whether the data are image mixture data.

10. The transmission method of claim 8, further comprising:
    encoding the text data after extracting the text data, wherein the encoded text data are transmitted to the management server.

11. The transmission method of claim 8, wherein:
    if the data are image mixture data, the data are divided into background color data for a background color of the data, picture data, and the text data; and
    the text data are extracted from the divided data.

12. The transmission method of claim 8, further comprising:
    controlling an extraction selection window to be displayed in a predetermined image display device to select the extraction of the text data if the data are the image mixture data.

13. The transmission method of claim 12, further comprising:
    receiving selection input information input by a user to control the extracting the text data after the controlling the extraction selection window has been performed.

14. A computer-readable medium to contain non-transitory computer-readable codes as a program to execute a transmission method of an image forming apparatus for security transmission of data, the transmission method comprising:
    extracting text data from data; and
    transmitting the text data to a management server to obtain transmission permission by determining whether the text data is predetermined protected data that is not to be distributed, and then transmitting the text data to a transmission target device according to the transmission permission where the text data is not the predetermined protected data.

15. An image forming apparatus comprising:
    a transmitter to transmit a portion of data to a management server without transmission permission, and to transmit an entire portion of the data to a transmission target device according to a transmission permission that determines that the portion of the data is not predetermined protected data that is not to be transmitted; and
    a controller to generate a window to control selection of the portion of the data when the data includes the portion and another portion.

16. The image forming apparatus of claim 15, further comprising:
    a scanning unit to scan a document to generate the data.

17. The image forming apparatus of claim 15, wherein the portion of the data comprises text data, and the another portion of the data comprises another data other than the text data.

18. An image forming apparatus comprising:
    an extractor to receive data including colors and to extract a portion of the received data;
    a transmitter to transmit the received data according to a transmission permission that determines that the extracted portion of the data is not predetermined protected data that is not to be transmitted; and
    a controller to generate a window to control selection of the portion of the data when the data includes the portion and another portion.

* * * * *